United States Patent [19]

Willard et al.

[11] Patent Number: 5,686,898
[45] Date of Patent: Nov. 11, 1997

[54] PAGING NETWORK IDENTIFICATION INFORMATION DISTRIBUTED IN ADDRESS FIELD

[75] Inventors: David Frank Willard, Plantation; Robert John Schwendeman, Pompano Beach; Michael Joseph DeLuca, Boca Raton, all of Fla.

[73] Assignee: Motorola, Inc., Schaumburg, Ill.

[21] Appl. No.: 546,231

[22] Filed: Oct. 20, 1995

Related U.S. Application Data

[63] Continuation of Ser. No. 254,467, Jun. 6, 1994, abandoned, which is a continuation of Ser. No. 890,973, May 29, 1992, abandoned.

[51] Int. Cl.$^6$ ............................................. H04Q 1/00
[52] U.S. Cl. ........................ 340/825.04; 340/825.44
[58] Field of Search ....................... 340/825.04, 825.52, 340/825.44, 825.21; 455/38.1, 33.1; 379/60

[56] References Cited

U.S. PATENT DOCUMENTS

| H610 | 3/1989 | Focarile et al. . | |
|---|---|---|---|
| 4,249,165 | 2/1981 | Mori . | |
| 4,509,203 | 4/1985 | Yamada . | |
| 4,518,961 | 5/1985 | Davis et al. | 340/825.44 |
| 4,644,347 | 2/1987 | Lucas et al. . | |
| 4,713,808 | 12/1987 | Gaskill et al. . | |
| 4,833,728 | 5/1989 | Kimura et al. . | |
| 4,849,750 | 7/1989 | Andros et al. . | |
| 4,914,649 | 4/1990 | Schwendeman et al. . | |
| 5,008,952 | 4/1991 | Davis et al. . | |
| 5,089,813 | 2/1992 | Deluca | 340/825.44 |

FOREIGN PATENT DOCUMENTS

WO87/00994 2/1987 WIPO .
WO91/10300 6/1991 WIPO .

*Primary Examiner*—Brian Zimmerman
*Attorney, Agent, or Firm*—Kelly A. Gardner; Philip P. Macnak

[57] ABSTRACT

A method by which a data communication receiver may recognize a specific channel comprises the steps of receiving (1605) a data stream on a first channel for a first amount of time to determine (1680) whether network identification information is included in the data stream received on the first channel, wherein the network identification information comprises at least one address assigned to represent a network. If the network identification information is not included in the data stream received on the first channel within the first amount of time, reception is switched (1614) to receive (1605) a data stream on a second channel. The method further comprises the step of receiving (1605) the data stream on the second channel for a second amount of time to determine (1680) whether the network identification information is included in the data stream received on the second channel. If the network identification information is not included in the data stream received on the second channel within the second amount of time, reception is switched (1614) to receive (1605) a data stream on a third channel.

11 Claims, 9 Drawing Sheets

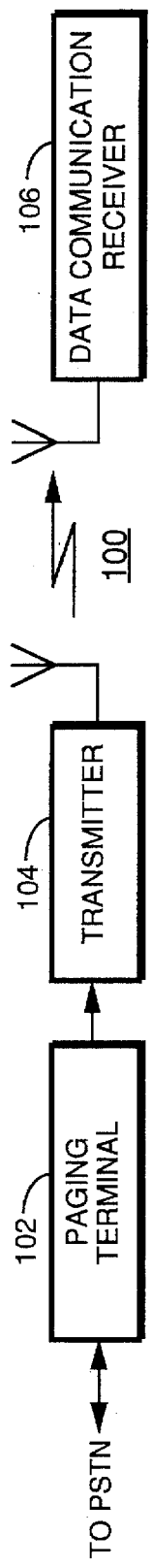
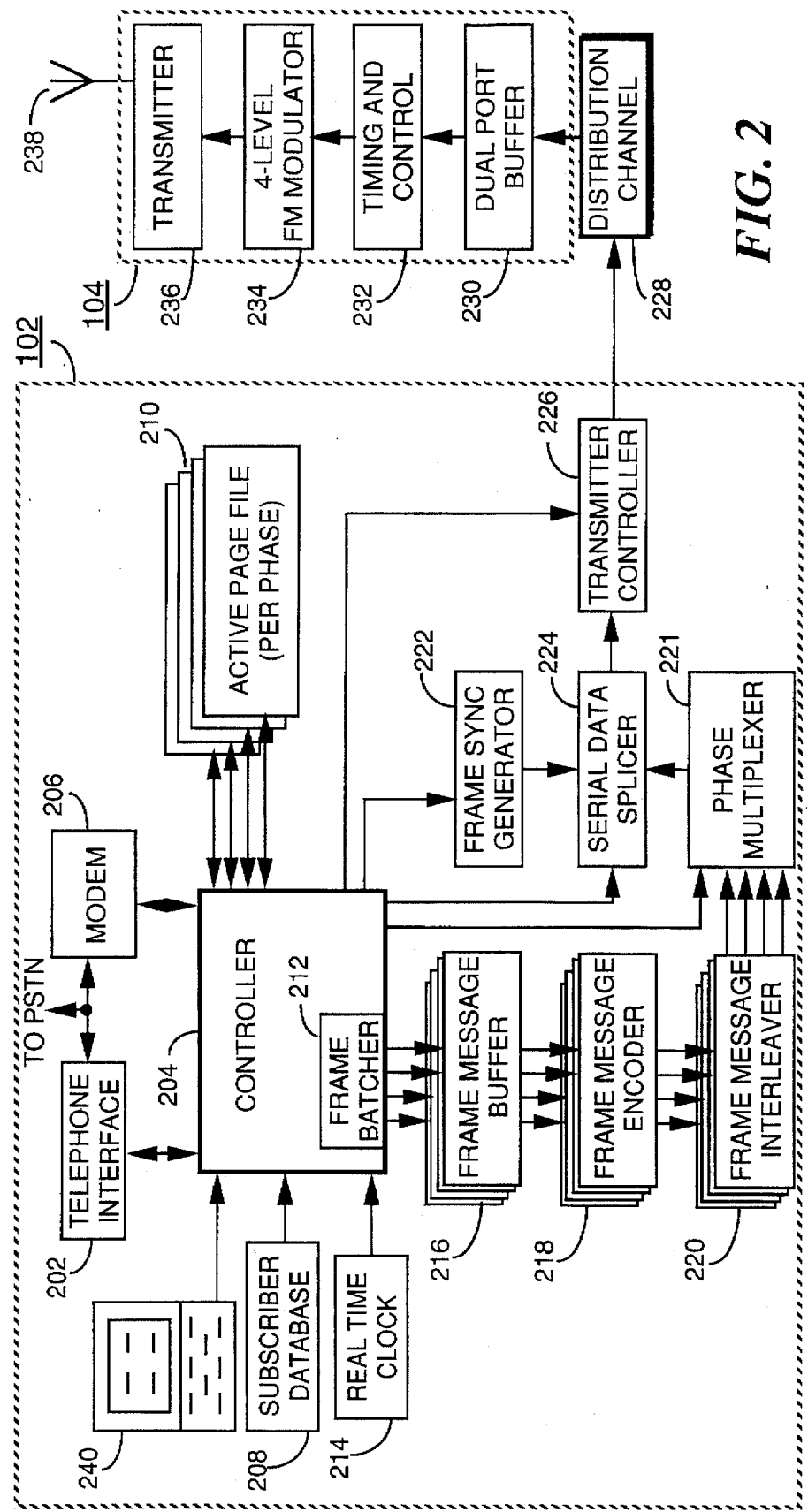

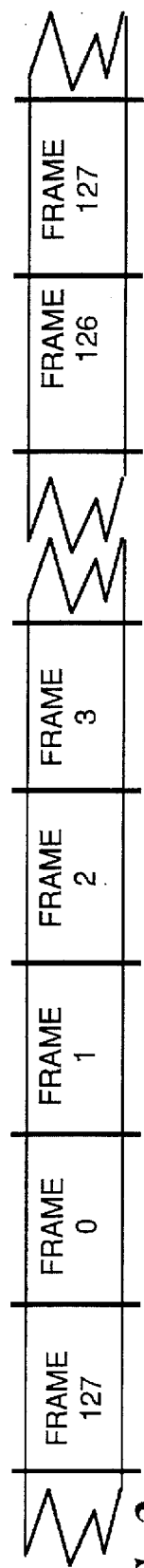
FIG. 3
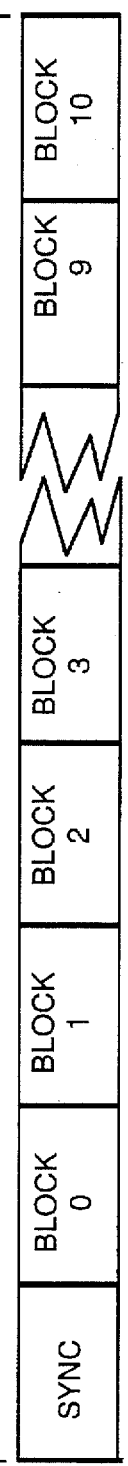
FIG. 4
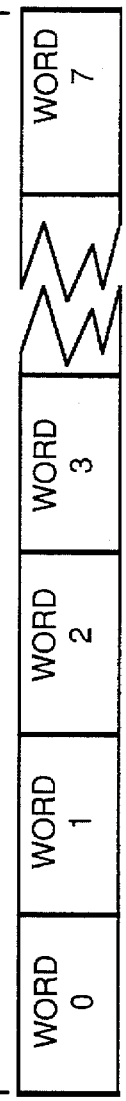
FIG. 5
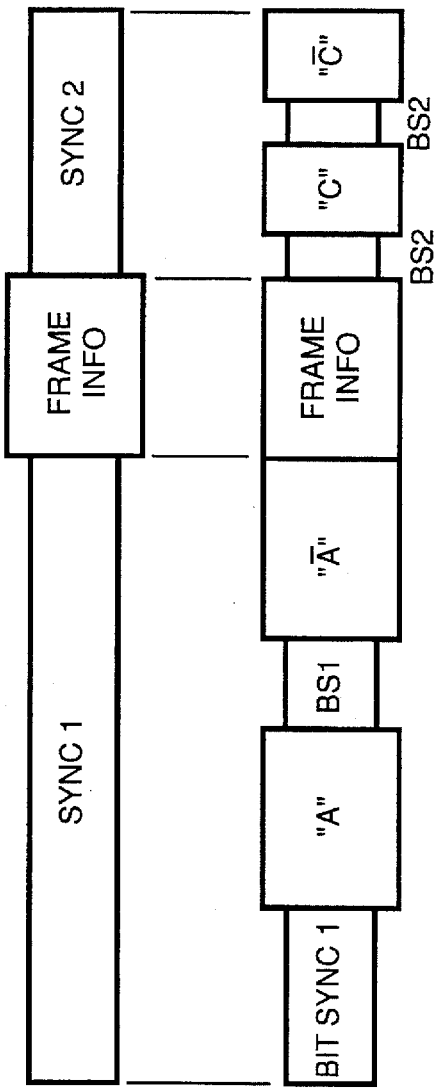
FIG. 7
FIG. 8

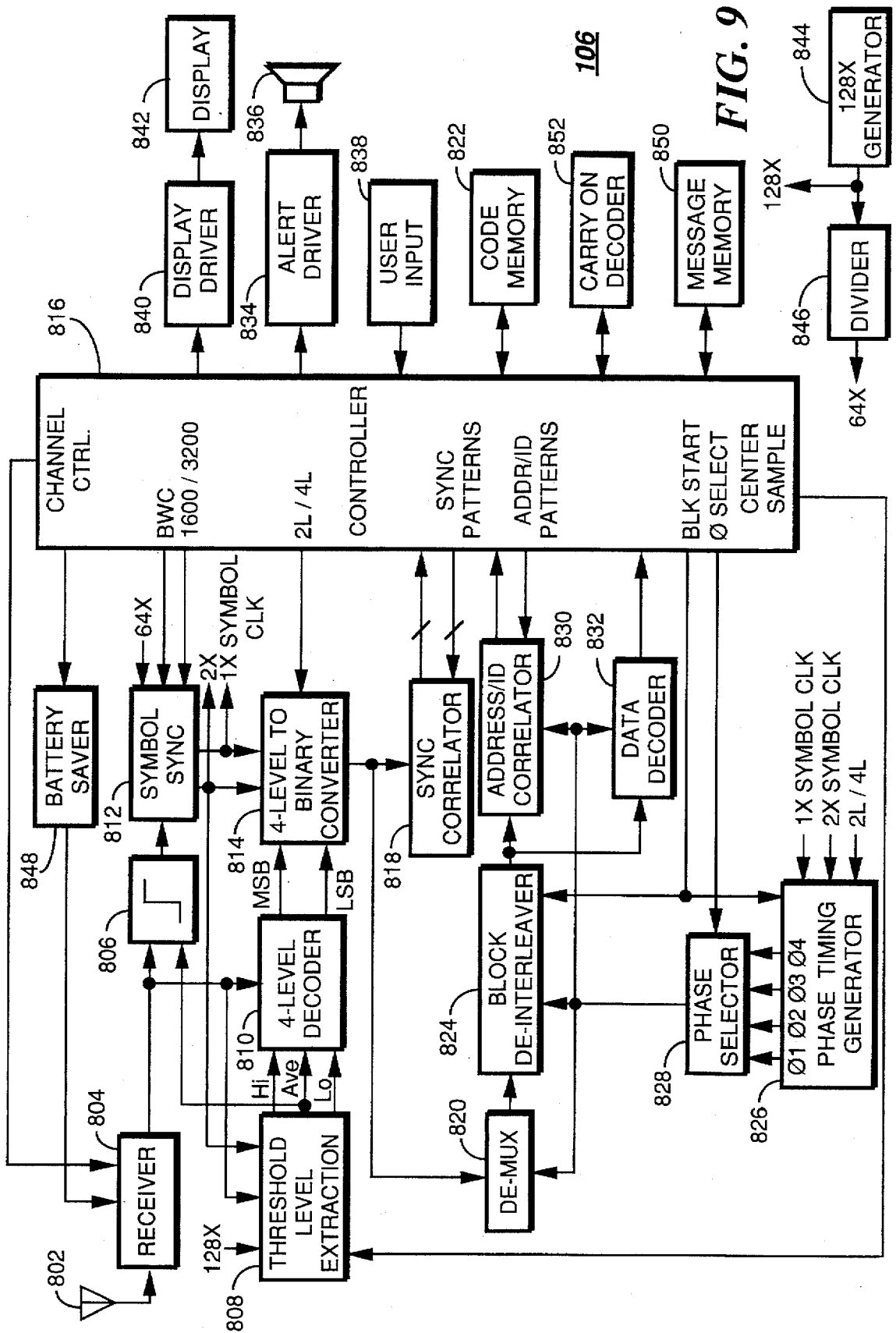

PAGING NETWORK IDENTIFICATION INFORMATION DISTRIBUTED IN ADDRESS FIELD

This is a continuation of application Ser. No. 08/254,467 filed on Jun. 6, 1994, now abandoned which is a continuation of prior application Ser. No. 07/890,973 filed on May 29, 1992, now abandoned.

FIELD OF THE INVENTION

This invention relates in general to selective call systems, and more specifically to a signalling protocol for use with a selective call system having a transmitter for transmitting network identification information and a plurality of data communication receivers for receiving the network identification information.

BACKGROUND OF THE INVENTION

With the increase in the popularity of selective call messaging, many users who travel frequently subscribe to selective call networks which provide service throughout large geographic areas. A user of a data communication receiver may, for example, subscribe to a nationwide service and thereby receive selective call messages throughout the nation. Conventionally, however, only a small number of frequencies are allocated for nationwide coverage. Therefore, each data communication receiver associated with a particular selective call network providing nationwide service receives messages on one of the few channels allocated for nationwide service. As increasing numbers of selective call users subscribe to selective call service and, more specifically, to networks providing nationwide coverage, overcrowding of existing selective call channels, both local and nationwide, is expected to increase. This overcrowding can result in long delays between the input of selective call messages to a selective call terminal and the transmission of the selective call messages from the terminal. Furthermore, as overcrowding of nationwide channels increases and channel capacity reaches a maximum, a point may be reached wherein no further users may subscribe to nationwide service on the existing nationwide channels. One solution to this problem is to increase the number of channels allocated to selective call messaging, and therefore to selective call networks providing nationwide service. However, this solution can only be implemented by the government regulating authorities that are already overburdened with requests for more radio frequency (RF) channel allocations from other types of services, such as land mobile and cellular telephone. Even if new channels are made available by the government, there is no guarantee that a particularly busy selective call provider will be able to obtain a license to provide nationwide service on the new channel.

A further solution to the problem of overcrowding on existing selective call channels is the use of data communication receivers that may receive messages on more than one channel. Some conventional data communication receivers allow the user, through manipulation of user actuated controls, to switch from one channel to another. In this manner, the data communication receiver could, if associated with a selective call network providing nationwide service, receive messages on one channel when located in a first geographic area and receive messages on a different channel when located in a second geographic area, thereby providing for nationwide service across a multiplicity of channels. This feature would allow a selective call network to transmit messages on a second channel in a specific geographic area if a first channel, on which the network may normally transmit, is assigned to a different service provider. For example, a subscriber to a nationwide network may receive messages on a local channel in Idaho, whereas, when he travels to Los Angeles, he may receive messages on a second channel if the local channel is allocated to a different service provider in the Los Angeles area. Although the use of multi-channel data communication receivers may, in some instances, provide for nationwide service not restricted to a single channel, such a solution depends on user input. In this situation, it might be necessary for a subscriber to a nationwide network to remember not only to switch receiver channels in different geographic areas, but also to remember which channel corresponds to each geographic area. If, for example, the subscriber forgets to switch to a different channel when traveling, or accidentally switches to an incorrect channel, he may not receive important selective call messages.

Thus, what is needed is a method and apparatus for automatically selecting a specific channel on which messages will be transmitted by a selective call terminal to a data communication receiver.

SUMMARY OF THE INVENTION

In accordance with a first aspect of the present invention, a method by which a data communication receiver may recognize a specific channel comprises the steps of receiving a data stream on a first channel for a first amount of time to determine whether network identification information is included in the data stream received on the first channel, wherein the network identification information comprises at least one address assigned to represent a network. If the network identification information is not included in the data stream received on the first channel within the first amount of time, reception is switched to receive a data stream on a second channel. The method further comprises the step of receiving the data stream on the second channel for a second amount of time to determine whether the network identification information is included in the data stream received on the second channel. If the network identification information is not included in the data stream received on the second channel within the second amount of time, reception is switched to receive a data stream on a third channel.

In accordance with a second aspect of the present invention, a data communication receiver capable of receiving data streams on multiple channels comprises a receiver for receiving data streams on a plurality of channels and a memory for storing information. The data communication receiver further comprises address correlating circuitry coupled to the receiver and the memory for determining if network identification information that is substantially equivalent to the stored information is included in a data stream, wherein the network identification information comprises at least one address assigned to represent a network. A synthesizer coupled to the receiver and the address correlating circuitry may switch reception from one channel included in the plurality of channels to at least two other channels included in the plurality of channels until reception of a data stream containing network identification information that is substantially equivalent to the stored information.

BRIEF DESCRIPTION OF THE DRAWINGS

FIG. 1 is an electrical block diagram of a data transmission system in accordance with the preferred embodiment of the present invention.

FIG. 2 is an electrical block diagram of a terminal for processing and transmitting message information in accordance with the preferred embodiment of the present invention.

FIGS. 3-5 are timing diagrams illustrating the transmission format of the signaling protocol utilized in accordance with the preferred embodiment of the present invention.

FIGS. 7 and 8 are timing diagrams illustrating the synchronization signals utilized in accordance with the preferred embodiment of the present invention.

FIG. 9 is an electrical block diagram of a data communication receiver in accordance with the preferred embodiment of the present invention.

DESCRIPTION OF A PREFERRED EMBODIMENT

Figure 6:
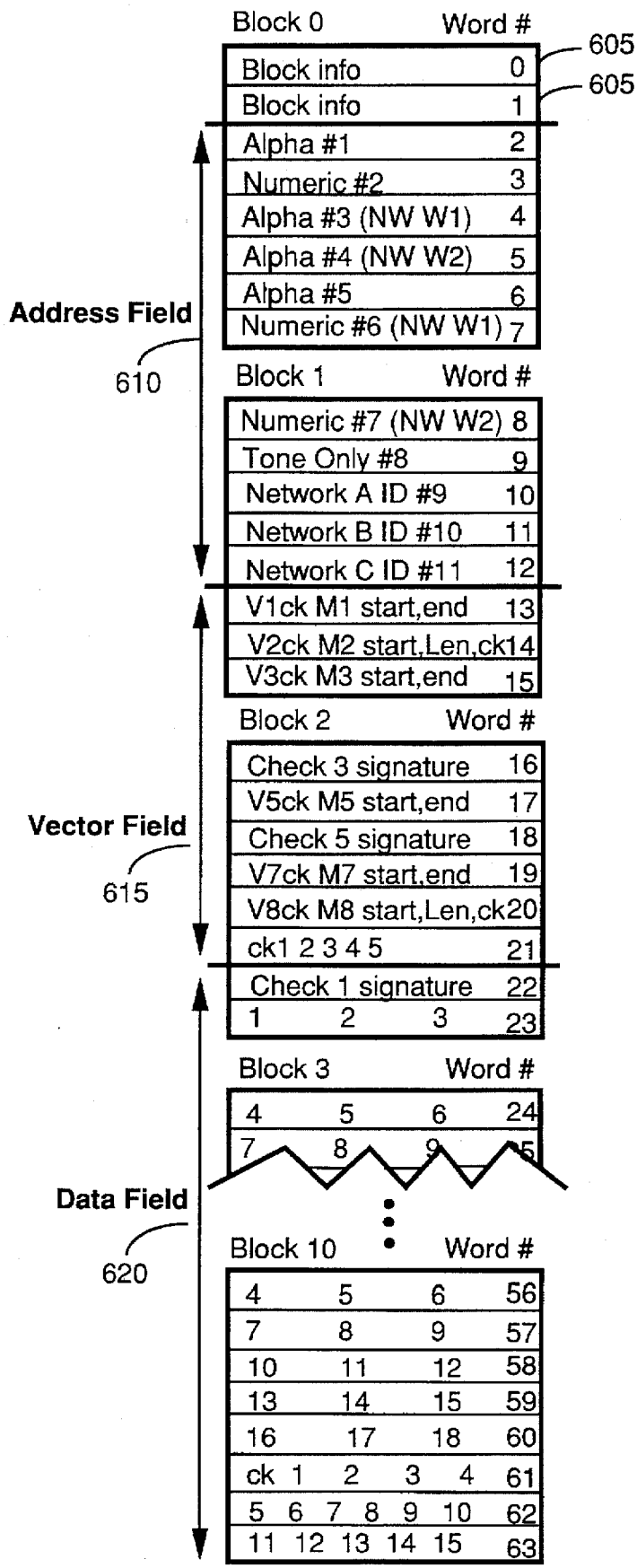
FIG. 6 is a diagram illustrating an address field, a vector field, and a data field contained in a frame, shown in FIGS. 3-5, in accordance with the preferred embodiment of the present invention.

FIG. 1 is an electrical block diagram of a data transmission system 100, such as a paging system, in accordance with the preferred embodiment of the present invention. In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information into message streams for transmission by one or more transmitters 104 provided within the system. In accordance with the preferred embodiment of the present invention, the paging terminal 102 further includes local identification information (local ID) and, if the paging terminal 102 processes message information for a selective call network, network identification information (network ID) as will be explained below. When multiple transmitters are utilized, the transmitters 104 preferably simulcast transmit the message streams, comprising at least the message information and the local ID, to data communication receivers 106. Processing of the numeric and alphanumeric information by the paging terminal 102, and the protocol utilized for the transmission of the messages is described below.

FIG. 2 is an electrical block diagram of the paging terminal 102 utilized for processing and controlling the transmission of the message information, the local ID, and, if appropriate, the network ID in accordance with the preferred embodiment of the present invention. Short messages, such as tone-only and numeric messages which can be readily entered using a Touch-Tone telephone are coupled to the paging terminal 102 through a telephone interface 202 in a manner well known in the art. Longer messages, such as alphanumeric messages which require the use of a data entry device, are coupled to the paging terminal 102 through a modem 206 using any of a number of well known modem transmission protocols. The paging terminal 102 may further receive network identification information corresponding to received messages from the telephone interface 202 or the modem 206, if appropriate. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to such information as addresses assigned to the data communication receiver, message type associated with the address, and information related to the status of the data communication receiver, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber database 208 also includes such information as to what transmission frame and to what transmission phase the data communication receiver is assigned, as will be described in further detail below. The received message is stored in an active page file 210 which stores the messages in queues according to the transmission phase assigned to the data communication receiver. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information and any network identification information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words, including the local ID and, if appropriate, the network ID, are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FM modulator 234. The modulated message stream is then coupled to the transmitter 236 for transmission via antenna 238.

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers, such as pagers, assigned to one or more of 128 frames which are labeled frame 0 through frame 127. It will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

As shown in FIG. 4, the frames comprise a synchronization code (sync) followed preferably by eleven blocks of message information which are labeled block 0 through block 10. As shown in FIG. 5, each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second bit which provides block parity, although it will be appreciated that other code word types, such as a 23,12 Golay code word could be utilized as well.

As shown in FIG. 6, the eleven blocks included in each frame comprise block information 605 specifying the beginning and end of an address field 610. In accordance with the preferred embodiment of the present invention, the block information 605 included in frame 0 contains an address referred to as a local ID. The local ID indicates to a data communication receiver whether it is located in its local reception area and receiving on the correct radio frequency (RF) channel. The address field 610 included in each frame contains addresses corresponding to data communication receivers which are to be recipients of messages included in the frame. In some cases, the addresses are associated with corresponding vectors. Preferably, alphanumeric and numeric addresses, which have associated vectors, are located near the beginning of the address field 610. Tone only addresses and, if appropriate, network IDs, neither of which have associated vectors, are located near the end of the address field 610. The presence of a network ID, in accordance with the preferred embodiment of the present invention, indicates to data communication receivers that the paging terminal 102 transmits messages to subscribers of a selective call network on the received channel. If more than one selective call network transmits messages from the paging terminal 102, each is identified by a different address in the address field 610, as shown in FIG. 6. Network IDs are preferably transmitted periodically, so that, if the data communication receiver does not receive a frame containing the correct network ID within the periodic time, the data communication may proceed to automatically scan other channels until the correct network ID, indicating the correct channel, is located.

Returning to FIG. 6, a vector field 615 follows the address field 610 in each frame. As described above, some addresses, such as those corresponding to alphanumeric or numeric messages, refer to a vector contained in the vector field 615. Such a vector specifies an area within a data field 620 wherein a corresponding message is located. In this manner, each addressed data communication receiver is able to located its intended message within each frame.

FIGS. 7 and 8 are timing diagrams illustrating the synchronization code utilized in accordance with the preferred embodiment of the present invention. In particular, as shown in FIG. 7, the synchronization code comprises preferably three parts, a first synchronization code (sync 1), a frame information code word (frame info) and a second synchronization code (sync 2). As shown in FIG. 8, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined provide high code word correlation reliability, and which are also used to indicate the data bit rate at which addresses and messages are transmitted. The table below defines the data bit rates which are used in conjunction with the signaling protocol.

Bit Rate "A" Value 1600 bps A1 and A1 bar 3200 bps A2 and A2 bar 6400 bps A3 and A3 bar Other Protocol A4 and A4 bar As shown in the table above, three data bit rates are predefined for address and message transmission, although it will be appreciated that more or less data bit rates can be predefined as well, depending upon the system requirements. A fourth bit rate is also predefined as that of any other signaling protocol which may share use of the channel with the protocol described above. Examples of other signaling protocols which would be compatible are the POCSAG signaling protocol and the Golay Sequential Code signaling protocol.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data bit rate, such as 1600 bps (bits per second), the second synchronization code is transmitted at the data bit rate at which the address and messages are to be transmitted in any given frame. Consequently, the second synchronization code allows the data communication receiver to obtain "fine" bit and frame synchronization at the frame transmission data bit rate.

In summary, the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

Figure 10:
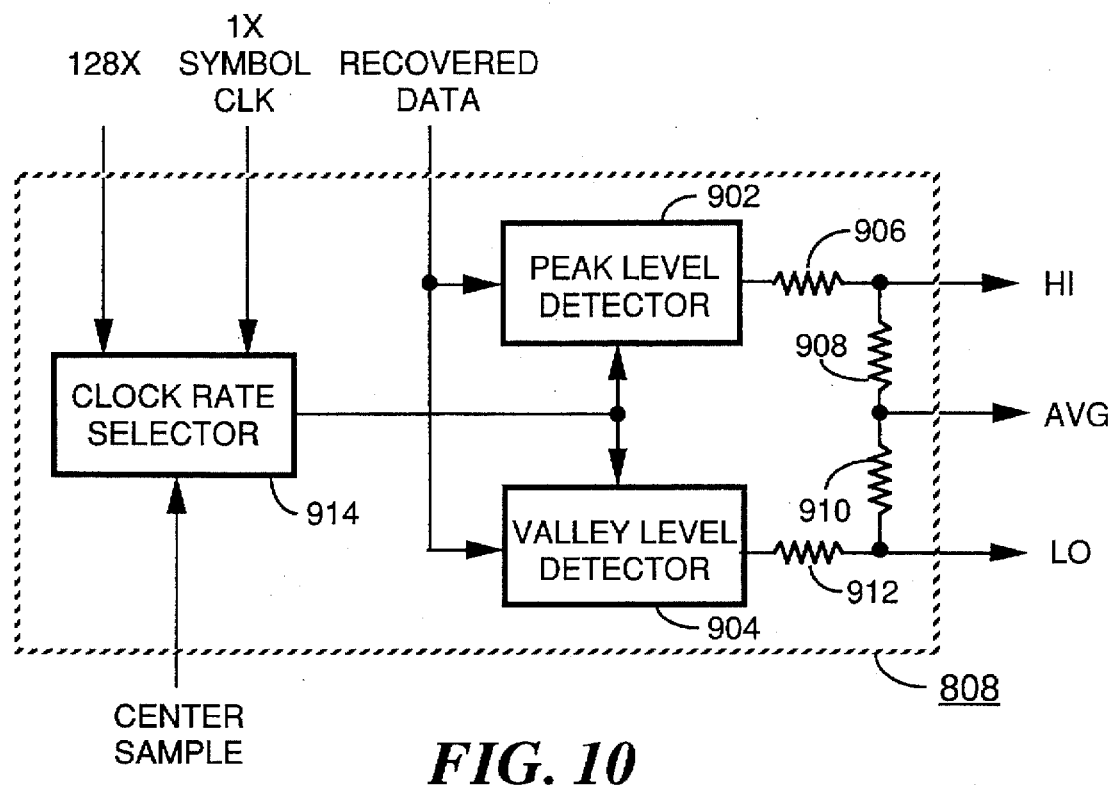
FIG. 10 is an electrical block diagram of a threshold level extraction circuit utilized in the data communication receiver of FIG. 9.

FIG. 9 is an electrical block diagram of the data communication receiver 106 in accordance with the preferred embodiment of the present invention. The data communication receiver 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a data limiter 806, to one input of a threshold level extraction circuit 808, and to an input of a 4-level decoder 810. The threshold level extraction circuit 808 is best understood by referring to FIG. 10, and as shown comprises two clocked level detector circuits 902, 904 which have as inputs the recovered data signal. Level detector 902 detects the peak signal amplitude value and provides a high peak threshold signal which is proportional to the detected peak signal amplitude value, while level detector 904 detects the valley signal amplitude value and provides a valley threshold signal which is proportional to the detected valley signal amplitude value of the recovered data signal. The level detector 902, 904 signal outputs are coupled to terminals of resistors 906, 912, respectively. The opposite resistor terminals 906, 912 provide the high threshold output signal (Hi), and the low threshold output signal (Lo), respectively. The opposite resistor terminals 906, 912 are also coupled to terminals of resistors 908, 910, respectively. The opposite resistor 908, 910 terminals are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 914 is preset through a control input (center sample) to select a 128X clock, i.e. a clock having a frequency equivalent to 128 times the slowest data bit rate, which as described above is 1600 bps. The 128X clock is generated by 128X clock generator 844, as shown in FIG. 8, which is preferably a crystal controlled oscillator operating at 204.8 kHz (kilohertz). The output of the 128X clock generator 844 couples to an input of frequency divider 846 which divides the output frequency by two to generate a 64X clock at 102.4 kHz. Returning to FIG. 10, the 128X clock allows the level detectors 902, 904 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (Center Sample) to enable selection of a 1X symbol clock which is generated by symbol synchronizer 812 as shown in FIG. 8.

Returning to FIG. 9, the average threshold output signal (AVG) is coupled to a second input of the data limiter 806. The data limiter 806 limits the analog 4-level recovered data signal to provide a symbol synchronization signal having a square wave output, the positive level representing the two positive deviation excursions of the analog 4-level recovered data signal above the average threshold output signal, and the negative level representing the two negative deviation excursions of the analog 4-level recovered data signal below the average threshold output signal. The average threshold output signal (AVG) enables adjustment of the limiter threshold which is required to insure symmetrical limiting of the analog 4-level recovered data signal.

Figure 12:
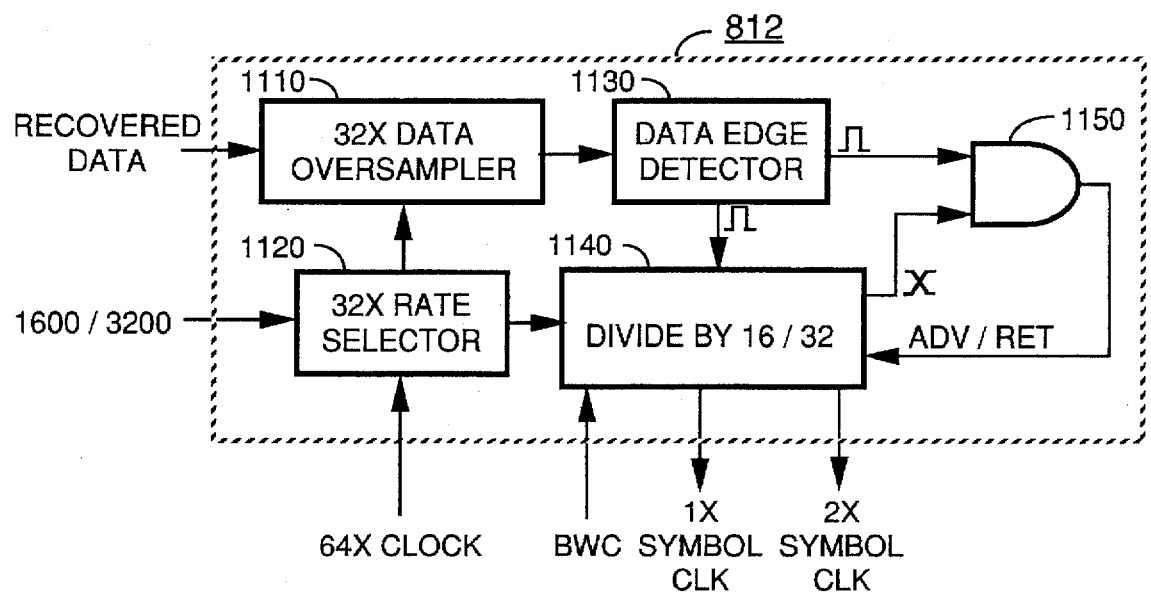
FIG. 12 is an electrical block diagram of a symbol synchronizer utilized in the data communication receiver of FIG. 9.

The output of the data limiter 806 is coupled to an input of the symbol synchronizer 812. The operation of the symbol synchronizer 812 is best understood by referring to FIG. 12. The 64X clock, generated by frequency divider 846, is coupled to an input of a 32X rate selector 1120. The 32X rate selector 1120 is preferably a divider which provides selective division by 1 or 2 to generate a sample clock which is thirty-two times the symbol transmission rate. A control signal (1600/3200) is coupled to a second input of the 32X rate selector 1120, and is used to select the sample clock rate for symbol transmission rates of 1600 and 3200 symbols per second. The selected sample clock is coupled to an input of 32X data oversampler 1110 which samples the recovered data signal at thirty-two samples per symbol. The symbol samples are coupled to an input of a data edge detector 1130 which generates an output pulse when a symbol edge is detected. The sample clock is also coupled to an input of a divide-by-16/32 circuit 1140 which is utilized to generate 1X and 2X symbol clocks synchronized to the recovered data signal. The divided-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-$^{16}/_{32}$ circuit 1140, the output generated by AND gate 1150 causes the count of divide-by-$^{16}/_{32}$ circuit 1140 to be retarded by one count in response to the pulse which is coupled to the input of divide-by-$^{16}/_{32}$ circuit 1140 from the data edge detector 1130, thereby enabling the synchronization of the 1X and 2X symbol clocks with the recovered data signal. The symbol clock rates generated are best understood from the table below.

| Input Clock (Relative) | Control Input (SPS) | Rate Selector Divide Ratio | Rate Selector Output | 2 X Symbol Clock (BPS) | 1 X Symbol Clock (BPS) |
|---|---|---|---|---|---|
| 64 X | 1600 | by 2 | 32 X | 3200 | 1600 |
| 64 X | 3200 | by 1 | 64 X | 6409 | 3200 |

As shown in the table above, symbol clocks of 1600, 3200 and 6400 bits per second are generated which are synchronized with the recovered data signal.

Figure 11:
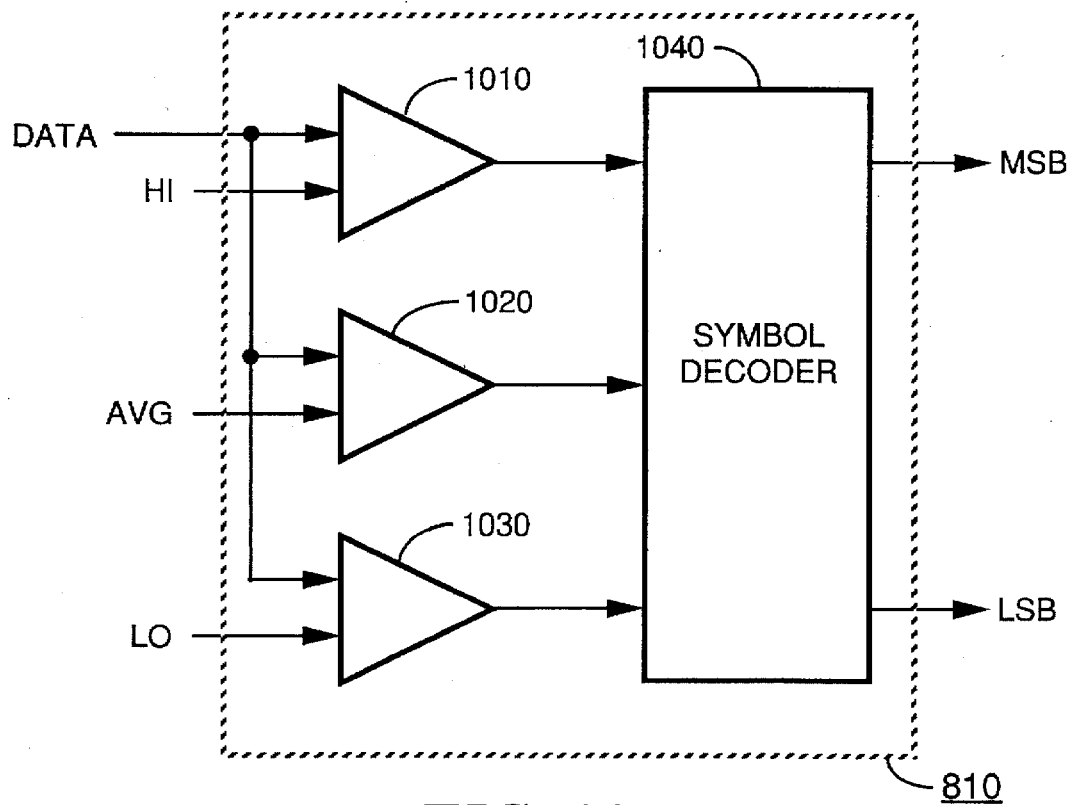
FIG. 11 is an electrical block diagram of a 4-level decoder utilized in the data communication receiver of FIG. 9.

The 4-level decoder 810 operation is best understood by referring to FIG. 11. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| Threshold | | | Output | |
|---|---|---|---|---|
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} <$ | $RC_{in} >$ | 1 | 1 |
| $RC_{in} >$ | $RC_{in} >$ | $RC_{in} >$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

Figure 13:
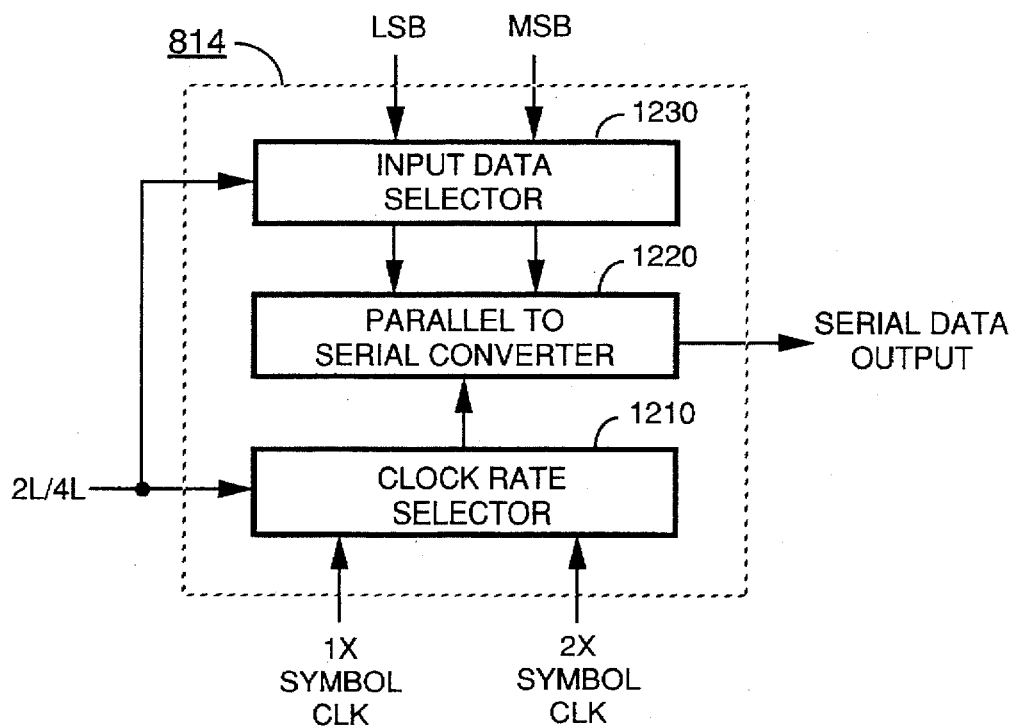
FIG. 13 is an electrical block diagram of a 4-level to binary converter utilized in the data communication receiver of FIG. 9.

The 4-level binary converter 814 is best understood by referring to FIG. 13. The 1X symbol clock is coupled to a first clock input of a clock rate selector 1210. A 2X symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data, or 4-level FSK data. When the 2-level FSK data conversion (2L) is selected, only the MSB output is selected which is coupled to the input of a parallel to serial converter 1220. The 1X clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2X clock input is selected by clock rate selector 1210 which results in a serial two bit binary data stream to be generated at 2X the symbol rate, which is provided at the output of the parallel to serial converter 1220.

Returning to FIG. 9, the serial binary data stream generated by the 4-level to binary converter 814 is coupled to inputs of a synchronization word correlator 818 and a demultiplexer 820. The synchronization word correlator is best understood with reference to FIG. 14. Predetermined "A" word synchronization patterns are recovered by the controller 816 from a code memory 822 and are coupled to an "A" word correlator 1310. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 9, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame numbers, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 14:
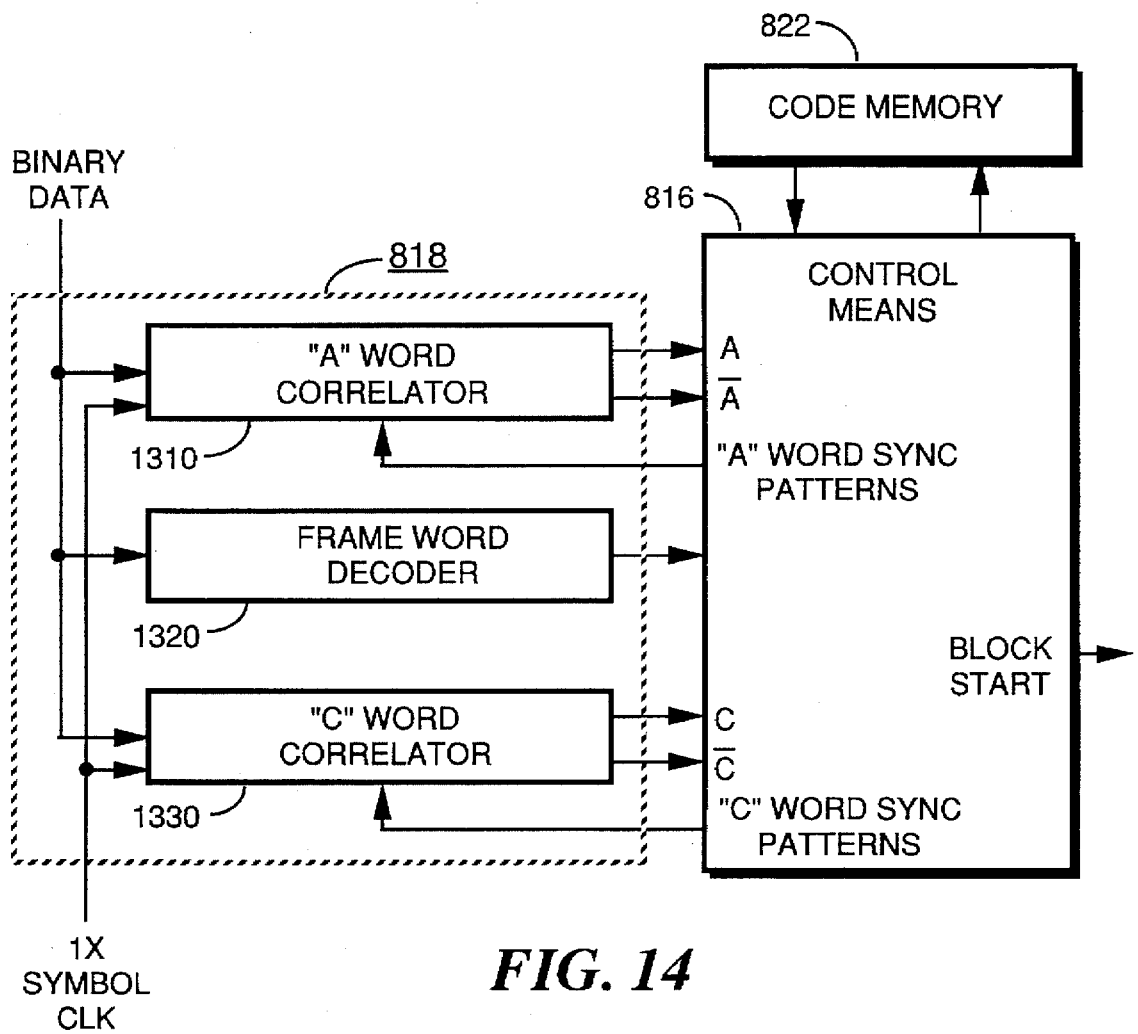
FIG. 14 is an electrical block diagram of a synchronization correlator utilized in the data communication receiver of FIG. 9.

Returning to the operation of the synchronization correlator shown in FIG. 14, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 15:
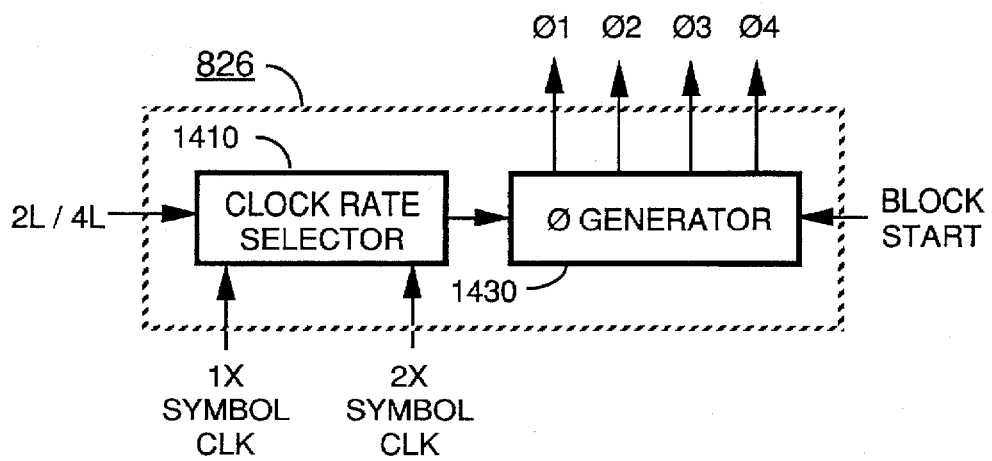
FIG. 15 is an electrical block diagram of a phase timing generator utilized in the data communication receiver of FIG. 8.

Returning to FIG. 9, the start of the actual data portion is established by the controller 816 generating a block start signal (Blk Start) which is coupled to inputs of a word de-interleaver 824 and a data recovery timing circuit 826. The data recovery timing circuit 826 is best understood by referring to FIG. 15. A control signal (2L/4L) is coupled to an input of clock rate selector 1410 which selects either 1X or 2X symbol clock inputs. The selected symbol clock is coupled to the input of a phase generator 1430 which is preferably a clocked ring counter which is clocked to generate four phase output signals ($\phi 1$–$\phi 4$). A block start signal is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 9, the clocked phase signal outputs are coupled to inputs of a phase selector 828. During operation, the controller 816 recovers from the code memory 822, the transmission phase number to which the data communication receiver is assigned. The phase number is transferred to the phase select output (φ Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, address/ID correlator 830, and data decoder 832. The demultiplexer 820 is used to select the binary bits associated with the assigned transmission phase which are then coupled to the input of block de-interleaver 824, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of the address/ID correlator 830. The controller 816 recovers the address patterns, local ID patterns, and network ID patterns assigned to the data communication receiver, and couples the patterns to a second input of the address correlator. If, in frame 0, the local ID included in the block information matches any of the local ID patterns assigned to the data communication receiver, normal operation of the data communication receiver, as described below, is resumed. If, however, the local ID does not match any of the local ID patterns, the data communication receiver monitors further incoming data, received in the manner described above, on the same channel for the presence of a network ID. Because the network ID is preferably transmitted periodically, the data communication receiver monitors the incoming data until either the periodic time has expired or the correct network ID is found. The presence of the correct network ID indicates that the data communication receiver is receiving data on a channel employed to transmit messages to subscribers of a particular selective call network, the user of the data communication receiver included. In this case, normal operation of the data communication receiver, as described below, is resumed. If, after expiration of the periodic time, the correct network ID has not been found, the controller sends a signal to the receiver 804, enabling it to switch the channel on which it receives data in a manner well known to one skilled in the art. In accordance with the preferred embodiment of the present invention, the data communication receiver automatically scans channels until a channel transmitting the correct local ID or network ID is found.

When the correct local ID or network ID is located, normal operation of the data communication receiver is resumed, and the de-interleaved address code words are compared to the address patterns assigned to the data communication receiver. When any of the de-interleaved address code words matches any of the address patterns assigned to the data communication receiver within an acceptable margin of error, the message information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory, and provides the message information to a display driver 840 for presentation on a display 842, such as an LCD display.

Figure 16:
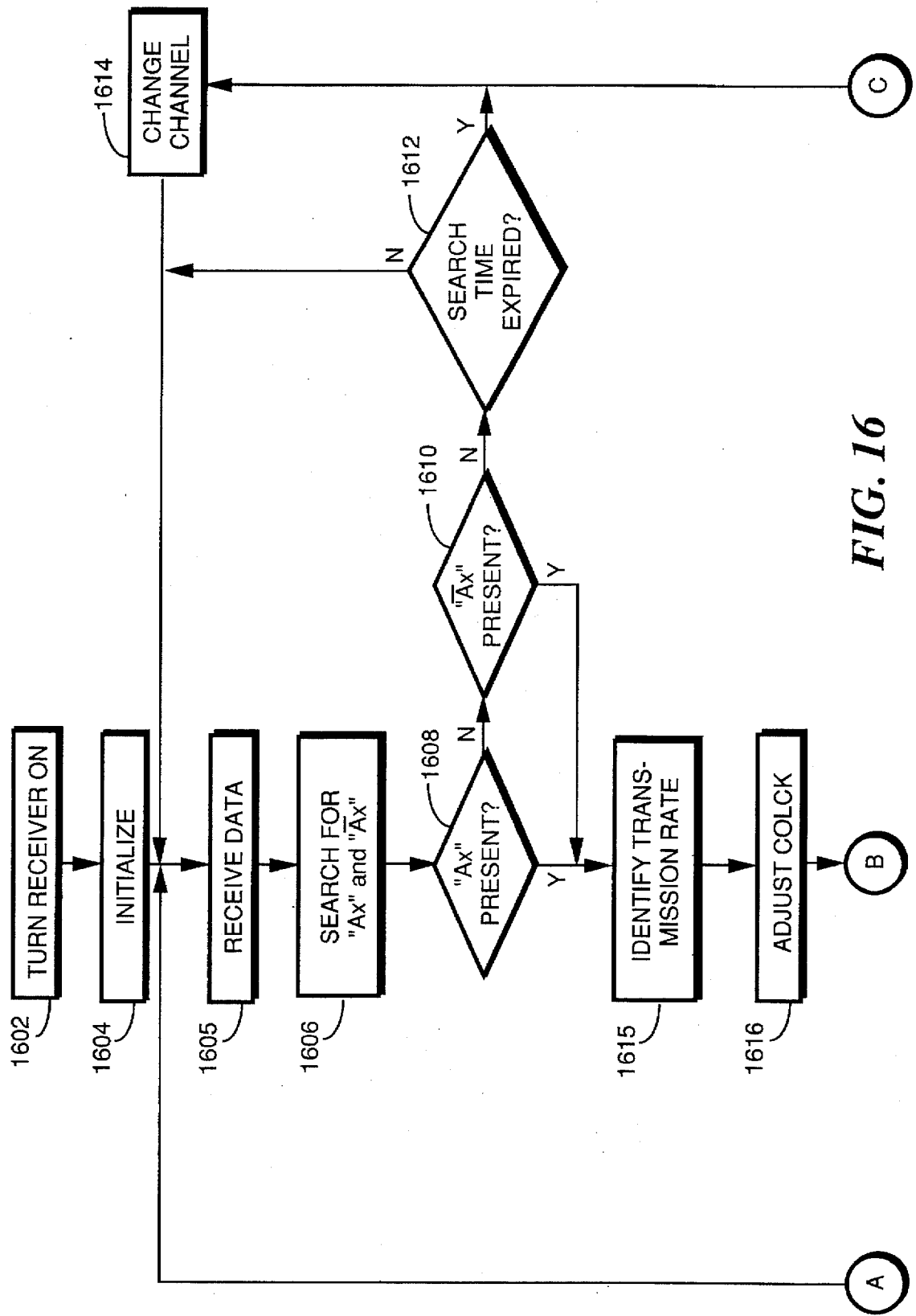
FIGS. 16 and 17 depict a flow chart illustrating the operation of the data communication receiver in accordance with the preferred embodiment of the present invention.
Figure 17:
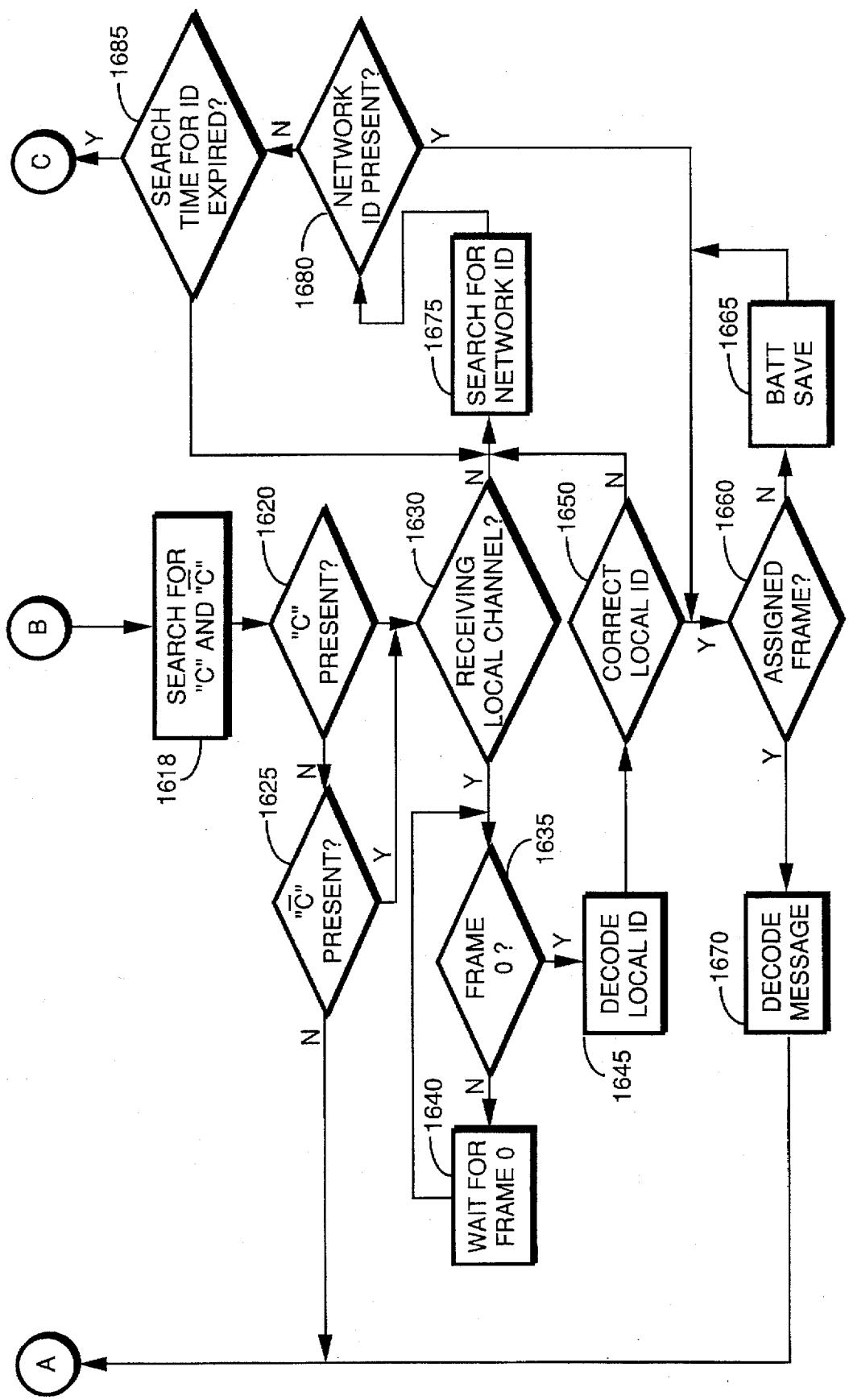

FIGS. 16 and 17 depict a flow chart describing the operation of the data communication receiver in accordance with the preferred embodiment of the present invention. When the data communication receiver is turned on 1602, the controller 816 (FIG. 9) operation is initialized 1604. When data is received 1605 on a first channel, the synchronization word correlator 818 searches for bit synchronization and begins 1606 "A" word correlation. If an "A" word is not detected 1608, the synchronization word correlator 818 searches for an "A bar" word 1606. If the "A bar" word is not detected 1610, the controller 816 determines 1612 whether a predetermined search time has expired. If not, the synchronization word correlator 818 continues to search 1606 for an "A" word or an "A bar" word. If neither is detected 1608, 1610 within the predetermined search time, indicating the absence of the correct protocol on the first channel, the controller 816 sends a signal to the receiver circuitry 804, in response to which a frequency synthesizer internal to the receiver circuitry 804 changes the reception of data to another channel 1614 in a manner well known to one skilled in the art. The data communication receiver, in this manner, receives data on further channels until transmission of the correct protocol is detected 1608, 1610.

When an "A" word or an "A bar" word is detected 1608, 1610, the synchronization word correlator 818 generates an output coupled to the controller 816. The controller 816 then identifies 1615 a data transmission rate in response to detection of a particular "A" word or "A bar" word. The symbol clock, provided by the symbol synchronizer 812, is then "finely" adjusted 1616 to the data transmission rate. The synchronization word correlator 818 thereafter begins to search 1618 for a "C" word. If the "C" word is not present 1620, the synchronization word correlator 818 checks for the presence of a "C bar" word. If the "C bar" word is not present 1625, indicating possible data corruption or possible fading signal strength on the channel, the synchronization word correlator 818 again begins to search 1606 for an "A" word or an "A bar" word.

When a "C" word or a "C bar" word is detected, the controller 816 determines 1630 whether the data was received on a local channel assigned to the data communication receiver. If so, the controller 816 determines 1635 whether the current frame included in the frame information is the first frame, referred to as frame zero. In accordance with the preferred embodiment of the present invention, information referred to as a local ID is included in each block zero of each frame zero, although it will be appreciated that the local ID could be located in any area of the data. If the current frame is not frame zero 1635, the synchronization word correlator 818 waits 1640 for reception of frame zero to decode 1645 the local ID included in the block information of the frame. The local ID is compared 1650 to local ID patterns retrieved from the code memory 822 by the controller 816. If the local ID matches one of the local ID patterns, indicating that messages intended for the data communication receiver will be received on the current channel, the controller 816 compares 1660 the frame number, in this case, frame zero, with a list of assigned frame numbers stored in the code memory 822. If the frame number differs from the assigned frame numbers, the controller 816 generates 1665 a battery saving signal to suspend the provision of power to the receiver circuitry 804. The supply of power is suspended until the next frame assigned to the data communication receiver is received. If the frame number is equivalent to one of the assigned frame numbers, any messages intended for the data communication receiver are decoded 1675 in the manner described in FIGS. 9–15.

If the current channel is not a local channel 1630 or if the decoded local ID is not assigned 1650 to the data communication receiver, the synchronization word correlator 818 begins to search 1675 for a network ID contained in the address field of the frame. The network ID, in accordance with the preferred embodiment of the present invention, is transmitted periodically, preferably at one minute intervals, on any channel on which messages intended for subscribers of a selective call network are to be transmitted. If the network ID assigned to the data communication receiver is not detected 1680 in the current frame, the synchronization word correlator 818 must continue to monitor 1675 further incoming frames for the periodic amount of time. Once the controller 816 determines that the periodic amount of time has expired 1685, the controller 816 sends a signal to the receiver circuitry 804, in response to which the frequency synthesizer changes 1614 the channel on which the receiver circuitry 804 receives data in a manner known to one skilled in the art. The data communication receiver thereafter receives data on further channels until the network ID is located 1680. When the synchronization word correlator 818 detects 1680 the network ID, indicating that messages intended for the data communication receiver are to be transmitted on the current channel, the controller 816 compares 1660 the frame number, in this case, frame zero, with a list of assigned frame numbers stored in the code memory. If the frame number differs from the assigned frame numbers, the controller 816 generates 1665 a battery saving signal to suspend the provision of power to the receiver circuitry 804. The supply of power is suspended until the next frame assigned to the data communication receiver is received. If the frame number is equivalent to one of the assigned frame numbers, messages intended for the data communication receiver are decoded 1675 in the manner described in FIGS. 9–15.

In an alternate embodiment of the present invention, while the data communication receiver is searching for the network ID, the data communication receiver may simultaneously decode 1670 messages in the manner described in FIGS. 9–15. However, until detection 1680 of the network ID, the messages will not be stored permanently and reception of the messages will not generate an alert. If the controller 816 determines that the periodic amount of time for detecting the network ID has expired 1685 without detecting the network ID, the controller deletes any message decoded 1670 during the periodic amount of time. The controller further sends a signal to the receiver circuitry 804, in response to which the frequency synthesizer changes 1614 the channel on which the receiver circuitry 804 receives data.

In summary, the presence of the local ID and the network ID, in accordance with the preferred embodiment of the present invention, alerts the data communication receiver to reception of data on the correct channel. In this manner, a selective call network may provide service to a large geographic area on more than one radio frequency channel and ensure that a subscriber to the selective call network may travel throughout the geographic area and automatically receive messages on the correct channel employed by the selective call network. If, for example, the subscriber normally receives messages on a first channel in his local area, his data communication receiver may automatically detect the absence of the local ID if he travels to another destination. Additionally, if the destination is within the geographic area serviced by the selective call network, the data communication receiver will automatically locate the correct channel, by detection of the network ID, for that specific area. The correct channel may be different from the local channel for various reasons, such as assignment of the local channel to a different service provider in a particular area. Therefore, the use of network IDs in accordance with the preferred embodiment of the present invention makes possible nationwide service which does not require a single nationwide channel. Furthermore, because the data communication receiver automatically detects the presence or absence of the network ID and local ID, reception of messages on the correct channel is not user dependent. In this manner, the possibility of the user, in the case of manual channel selection, forgetting to change to the correct channel or changing to a wrong channel is eliminated. By automatically scanning channels until the correct channel is located, the data communication receiver is able to automatically receive messages wherever the subscriber might travel within the geographic area serviced by the selective call network.

By now it will be appreciated that there has been provided a method and apparatus for automatically selecting a specific channel on which messages will be transmitted by a selective call terminal to a data communication receiver.

We claim:

1. A terminal for transmitting information, the terminal comprising:

a transmitter for transmitting a data stream comprising an address field for uniquely identifying receivers to which information is to be transmitted, a message field corresponding to the address field, and a control information field including a local ID indicative of the local reception area, wherein, when the terminal processes messages for at least one selective call network associated with at least one geographic area distinct from a local reception area, the address field comprises:

a number of network IDs, each uniquely corresponding to a selective call network for which the terminal processes messages, wherein the number of network IDs varies according to the number of selective call networks for which the terminal processes messages, and wherein the number of network IDs queued into the address field equals zero when the terminal processes no messages for any selective call networks associated with geographic areas distinct from the local reception area; and queuing means coupled to the transmitter for queuing the number of network IDs into the address field.

2. The terminal of claim 1, further comprising means for receiving each of the number of network IDs for queuing into the address field.

3. The terminal of claim 1, wherein the data stream further comprises a predetermined synchronization pattern for identifying the bit rate at which the control information field, the address field, and the message field are transmitted.

4. The terminal of claim 1, wherein the data stream further includes a vector field, and wherein addresses queued within the address field refer to a vector within the vector field, the vector identifying the location of a corresponding message within the message field.

5. A communication system for proving information in a local reception area, the communication system comprising:
   a terminal for transmitting the information, the terminal including:
      a transmitter for transmitting a data stream comprising an address field for uniquely identifying receivers to which information is to be transmitted, a message field corresponding to the address field, and a control information field including a local ID indicative of the local reception area, wherein, when the terminal processes messages for at least one selective call network associated with at least one geographic area distinct from the local reception area, the address field comprises:
         a number of network IDs, each uniquely corresponding to a selective call network for which the terminal processes messages, wherein the number of network IDs varies according to the number of selective call networks for which the terminal processes messages, and wherein the number of network IDs queued into the address field equals zero when the terminal processes no messages for any selective call networks associated with geographic areas distinct from the local reception area; and
      queuing means coupled to the transmitter for queuing the number of network IDs into the address field; and
   data communication receivers located in the local reception area for receiving the information.

6. The communication system of claim 5, wherein the data communication receivers comprise at least one receiver for receiving at least one message included in the data stream in response to receiving the local ID.

7. The communication system of claim 5, wherein the data communication receivers comprise at least one receiver for receiving at least one message included in the data stream in responses to receiving a network ID included in the number of network IDs queued in the address field, wherein the at least one receiver is associated with a selective call system that is represented by the network ID and that is distinct from the communication system, and wherein the at least one receiver normally receives messages in a geographic area that is associated with the selective call system and that is distinct from the local reception area.

8. The communication system of claim 5, wherein the data stream further comprises a predetermined synchronization pattern for identifying the bit rate at which the control information field, the address field, and the message field are transmitted.

9. The communication system of claim 5, wherein the data stream further includes a vector field, and wherein addresses queued within the address field refer to a vector within the vector field, the vector identifying the location of a corresponding message within the message field.

10. The communication system of claim 5, wherein the terminal further comprises means for receiving each of the number of network IDs for queuing into the address field.

11. The communication system of claim 10, wherein the means for receiving each of the number of network IDs comprises a telephone interface.

* * * * *